April 20, 1965 W. B. BROWN 3,178,878
METHOD OF DYNAMIC BALANCING OF SUPPLY SPINDLES OF TAPING HEADS
Filed Sept. 4, 1962
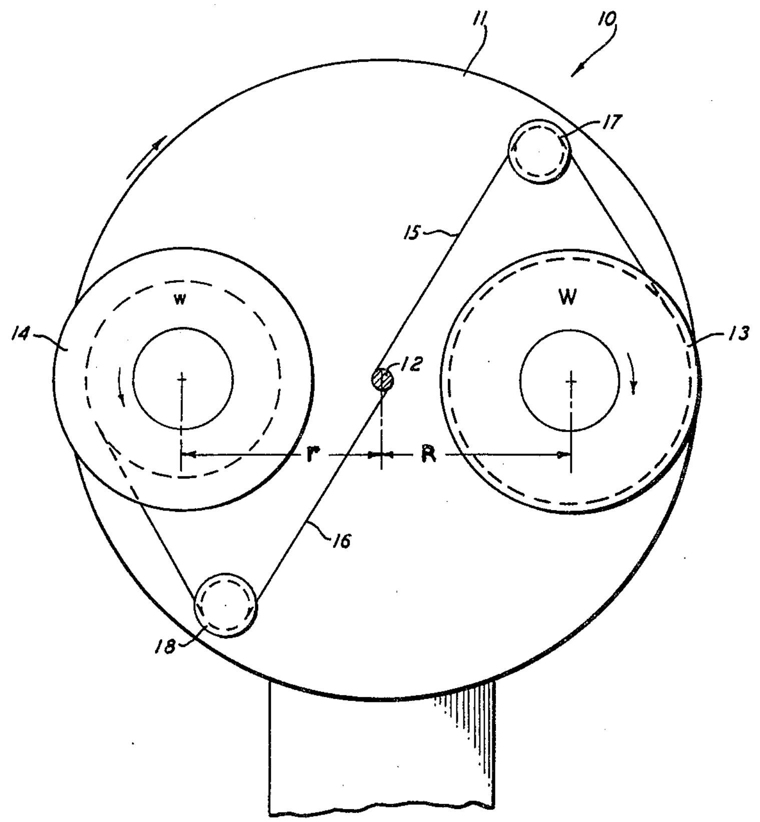
INVENTOR.
W. B. BROWN
BY S. Gundersen
ATTORNEY United States Patent Office 3,178,878

Patented Apr. 20, 1965

3,178,878

METHOD OF DYNAMIC BALANCING OF SUPPLY SPINDLES OF TAPING HEADS

William B. Brown, Pasadena, Md., assignor to Western Electric Company, Incorporated, New York, N.Y., a corporation of New York Filed Sept. 4, 1962, Ser. No. 221,119
4 Claims. (Cl. 57—160)

This invention relates to a method of dynamically balancing taping heads, and particularly to a method for dynamically balancing a taping head which is rotating at a high rate of speed while paying out different weights of tape from supply reels mounted on the taping head.

In taping cables, one layer of tape is placed over a first layer of tape. Consequently, as the outer layer of tape has a larger diameter than the inner layer, a longer length of tape is required to be paid off the corresponding supply reel than is paid off the supply reel for the other tape. Therefore, due to the different feeding rates of the tapes, difficulty is encountered in keeping the taping head in dynamic balance.

Difficulty is also encountered where it is necessary to tape the cable with tapes having a different weight per unit length. In this instance even if the tape is paid out at the same rate, a greater weight of tape will be paid out from one supply reel per unit length of time than a supply reel for a lighter tape, thereby disrupting the dynamic balance of the taping head.

In order to obviate these difficulties, the method of the instant invention was developed in order to maintain the taping head in dynamic balance throughout the entire taping operation.

It is therefore an object of this invention to provide a method for maintaining a taping head in dynamic balance throughout the entire taping operation.

With this and other objects in view, the present invention contemplates a method of dynamically balancing a multiple-tape taping head by determining the amount of tape to be carried by each supply reel to tape a given length of cable, positioning the empty supply reels at proportional distances from the axis of rotation of the taping head, which distances are inversely proportional to the amounts or weights of the tapes so as to dynamically balance the amount of tape to be carried by each supply wheel, and dynamically balancing the taping head with empty reels thus positioned. As within any given time interval, the ratio of the weights of the tapes remaining on each supply reel will remain constant and the taping head will be in dynamic balance from full to empty reels.

Other objects and advantages of the present invention will be apparent from the following detailed description when considered in conjunction with the accompanying drawing wherein:

A revolving taping head embodying the novel features of the invention is schematically shown.

Referring in detail to the drawing, a taping head is generally indicated by numeral 10. A spindle housing 11 is mounted for rotation about a cable 12 and tape-dispensing supply reels 13 and 14 are mounted for rotation on the spindle housing 11. Any suitable arrangement for rotating the spindle housing may be used, e.g., the spindle housing may be mounted on a shaft which is driven by a motor. Tape-dispensing reels 13 and 14 are loaded with tape 15 and 16, respectively. Purely by way of illustration, two tape-dispensing reels are shown in the drawing, as the principles of the invention can readily be utilized with any number of tape-dispensing reels. Guides 17 and 18 serve to properly position and to direct the tape relative to the cable 12.

As will be readily seen from the drawing, rotation of the spindle housing will cause the tape 15 and 16 to be wrapped around cable 12, which in turn will rotate the tape-dispensing reels 13 and 14. As the cable 12 is advanced through the revolving taping head (out of the drawing) tape 15 and 16 will be wrapped about the cable. Suitable braking means may be provided for the supply reels 13 and 14 so as to wrap the tape tightly about the cable 12.

Tape 16 is applied directly to the cable 12 and tape 15 is applied on top of tape 16, therefore, due to the greater diameter about which the tape 15 is applied, more of tape 15 will be required than of tape 16 in order to tape any given length of the cable 12.

Supply reels 13 and 14 are identical in size, shape and weight. In accordance with the invention, the supply reels 13 and 14 are positioned at different distances from the axis of rotation of the taping head, and the taping head is balanced with empty reels in order to maintain the taping head in dynamic balance from full to empty reels. Obviously, if the weights of supply reels 13 and 14 were chosen so as to be proportional to each other by the same ratio as the tape, it would be unnecessary to balance the taping head with empty reels. The taping head 10 may be dynamically balanced, for example, by placing counterweights thereon or by drilling holes therein.

The taping head 10 is balanced with empty reels, so that one need only consider the weight of the tape carried by the supply reels in positioning the reels on the taping head. When dissimilar tapes are carried by the supply reels and the tape is paid out at the same rate, the reels are placed at distances from the axis of rotation which are inversely proportional to the difference in weight between the tapes. Where the tape is paid out at a different rate from the supply reels, each of the supply reels are loaded proportionately to the amount of tape required to tape a unit length of cable. Where the tape is paid out at different rates, the ratio of the distances between the supply reels must be inversely proportional to the ratio between the weight of the tape thus loaded on the supply reels. Therefore, at any given time interval, the weight of the tape remaining on the supply reels will be in dynamic balance on the dynamically balanced taping head, whereby the taping head as a whole will remain in dynamic balance from full to empty reels. Dynamic balance is thus achieved even where dissimilar tape is paid off the supply reels at different rates.

The weight of the tape on supply reel 13 is represented by "W" and the weight of the tape on reel 14 is represented by "$w$." Supply reel 13 is placed a distance "R," and supply reel 14 is placed a distance "$r$," from the axis of rotation of the taping head. In order to balance the tapes 15 and 16 on the taping head, it is necessary that the momentum "MV" of supply reel 15 equal the momentum "$mv$" of supply reel 16.

$$MV=mv$$

where:

$M$=mass of the tape on reel 13
$m$=mass of the tape on reel 14
$V$=velocity of reel 13
$v$=velocity of reel 14

As $$M=\frac{W}{g} \text{ and } m=\frac{w}{g}$$

where:

$W$=weight of the tape on reel 13
$w$=weight of the tape on reel 14
$g$=gravitational constant then $$\frac{W}{g}V=\frac{w}{g}v \text{ or } WV=wv$$

As $$\omega=\frac{V}{R} \text{ and } \omega=\frac{v}{r}$$

where:

$\omega$=angular velocity of the taping head
$R$=distance of reel 13 from axis of rotation
$r$=distance of reel 14 from axis of rotation then $$V=\omega R \text{ and } v=\omega r$$

therefore $$W\omega R=w\omega r$$

or $RW=rw$, or $$\frac{W}{w}=\frac{r}{R}$$

Therefore, in order to balance the weight of the tape on the different reels, it is necessary to place the reels a distance from the axis of rotation where the ratio $$\frac{r}{R}$$

of the distances of the supply reels from the axis of rotation will equal the ratio $$\frac{W}{w}$$

of the weight of the tape on the supply reels. As at any given time interval the ratio $$\frac{\Delta W}{\Delta w}$$

will be equal to the ratio $$\frac{r}{R}$$

the ratio of the weights of the tape on the supply reels will be equal to the same ratio from full to empty reels. Therefore, the taping head will be in dynamic balance from full to empty reels.

Another way of arriving at the same conclusion is to place the centrifugal force of reel 13

$$\frac{WV^2}{gr}$$

equal to the centrifugal force of reel 14

$$\frac{Wv^2}{gr}$$

about the axis of rotation of the taping head $$\frac{WV^2}{gR}=\frac{wv^2}{gr} \text{ or } \frac{WV^2}{R}=\frac{wv^2}{r}$$

As $$\omega=\frac{V}{R} \text{ and } \omega=\frac{v}{r}$$

then $$V^2=\omega^2R^2 \text{ and } v^2=\omega^2r^2$$

therefore $$\frac{W\omega^2R^2}{R}=\frac{w\omega^2r^2}{r}$$

or $$WR=wr \text{ or } \frac{w}{W}=\frac{R}{r}$$

Therefore, as noted above, where the ratio of the weight of the tape is inversely proportional to the ratio of the distances of the reels from the axis of rotation, the taping head will be in dynamic balance from full to empty reels.

Where the supply reels on a particular taping head are always loaded according to the same ratio, permanent mountings for the reels may be provided. Where this is not the case, any suitable means for radially shifting the mountings relative to each other may be provided in order to dynamically balance the taping head for different weights of tape.

If the tape 15, for example, is payed out at 9 unit lengths per revolution of the taping head and tape 16 is payed out at 8 unit lengths per revolution of the taping head, then 9/8 as much tape will be placed on supply reel 14 as on supply reel 13, and reel 13 will be placed 9/8 as far from the axis of rotation as reel 14.

The above-described methods and arrangements of apparatus are simply illustrative of an application of the principles of the invention and many other modifications may be made without departing from the invention.

What is claimed is:

1. In a method of dynamically balancing a taping head paying out tape from a plurality of supply reels at different weight rates comprising the steps of:
loading tape-dispensing reels with sufficient tape to tape a given taping operation,
placing the tape-dispensing reels distances from the axis of rotation of the taping head which are inversely proportional to the weight of the tape carried by the supply reels so as to dynamically balance the tape on the taping head, and
balancing the taping head with the empty reels thereon, whereby the taping head is in dynamic balance from full to empty reels.

2. In a method of dynamically balancing a taping head paying out tape from a plurality of supply reels at different weight rates comprising the steps of:
loading tape-dispensing reels with sufficient tape to tape a given taping operation,
placing tape-dispensing reels proportional distances from the axis of rotation of the taping head so as to dynamically balance the weight of the tape carried by the supply reels on the taping head, wherein the distance of the dispensing reels from the axis of rotation is determined by the relationship $$\frac{W}{w}=\frac{r}{R}$$

where:

$W$=the weight of the tape on a first supply reel
$w$=the weight of the tape on a second supply reel
$R$=the distance of the weight W from the axis of rotation of the taping head
$r$=the distance of the weight $w$ from the axis of rotation of the taping head, and
balancing the taping head with the empty reels thereon, whereby the taping head is in dynamic balance from full to empty reels.

3. In a method of dynamically balancing a taping head paying out tape from a plurality of tape-dispensing supply reels at different rates comprising the steps of:
loading tape-dispensing supply reels with sufficient tape to complete a given taping operation,
placing the tape-dispensing reels distances from the axis of rotation of the taping head which are inversely proportional to the weight of the tape carried by the supply reels so as to balance the tape carried by the reels on the taping head, and
balancing the taping head with empty reels thereon, whereby the taping head is in dynamic balance from full to empty reels.

4. In a method of dynamically balancing a taping head paying out tape from two tape-dispensing supply reels at different rates, comprising the steps of:
loading two tape-dispensing supply reels with sufficient tape to complete the taping of a given length of cable, placing the first and second tape-dispensing supply reel on opposite sides of the taping head, wherein the distance of the reels from the axis of rotation of the taping head is determined by the relationship $$\frac{W}{w}=\frac{r}{R}$$

wherein:

$W$=the weight of the tape on a first reel
$w$=the weight of the tape on a second reel
$R$=the distance of the weight W from the axis of rotation of the taping head
$r$=the distance of the weight $w$ from the axis of rotation of the taping head, and balancing the taping head with the reels in an unloaded condition whereby the taping head is in dynamic balance from full to empty reels.

References Cited by the Examiner

UNITED STATES PATENTS

| | | | |
|---|---|---|---|
| 417,219 | 12/89 | Beals | 57—15 |
| 3,137,985 | 6/64 | Bailey | 57—13 |

FOREIGN PATENTS

| | | |
|---|---|---|
| 646,871 | 6/37 | Germany. |

MERVIN STEIN, *Primary Examiner.*